Figure 7:
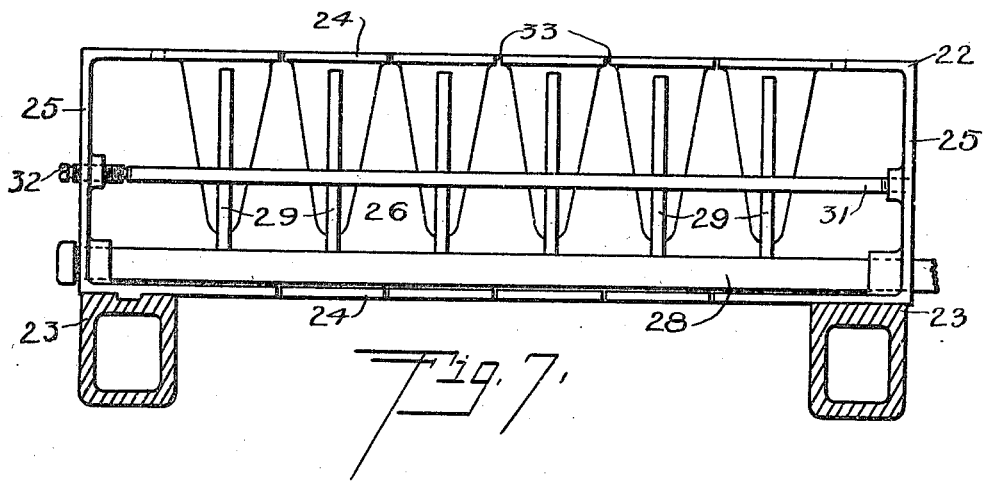

W. J. RUMPLE.
MACHINE FOR MAKING PASTRY.
APPLICATION FILED OCT. 19, 1911. RENEWED MAY 19, 1915.
1,151,548.  
Patented Aug. 24, 1915.  
5 SHEETS—SHEET 1.
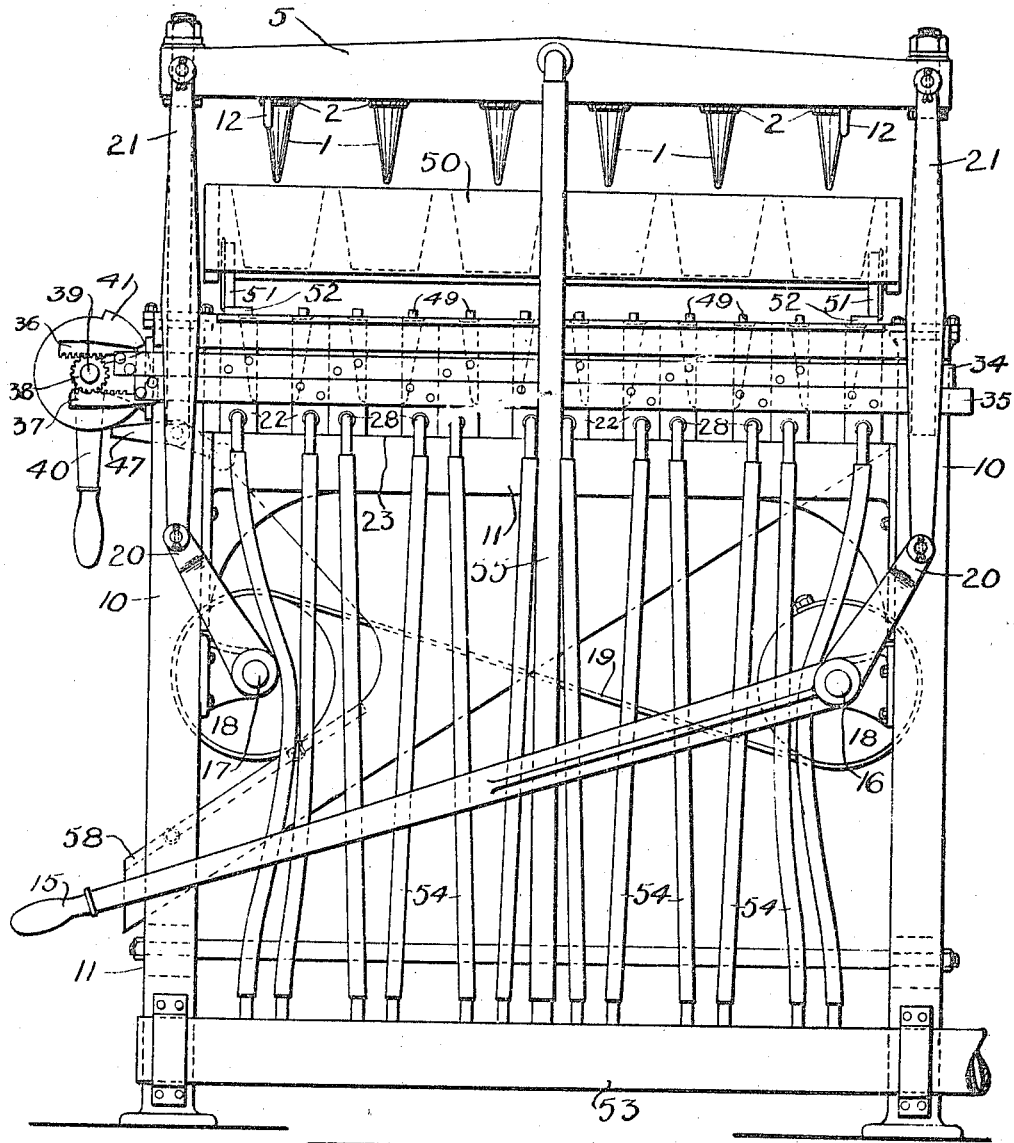

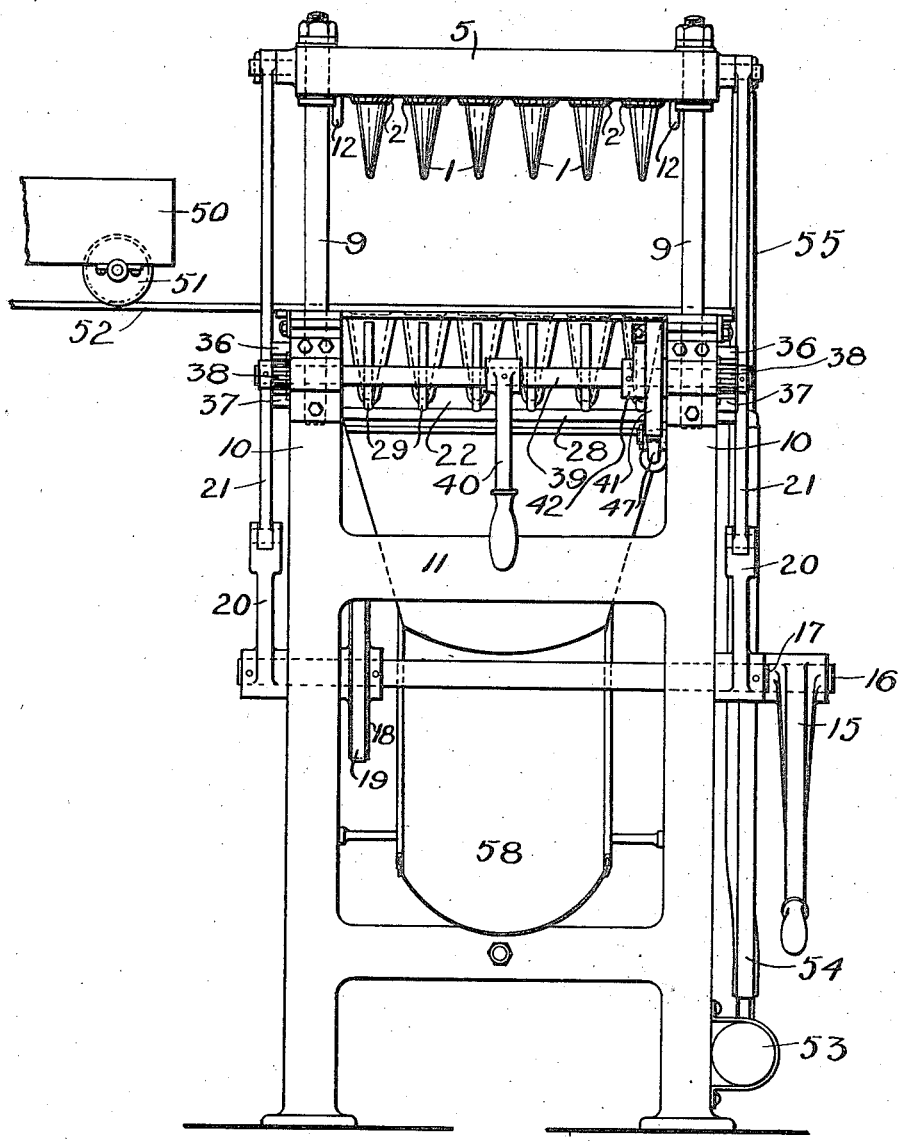

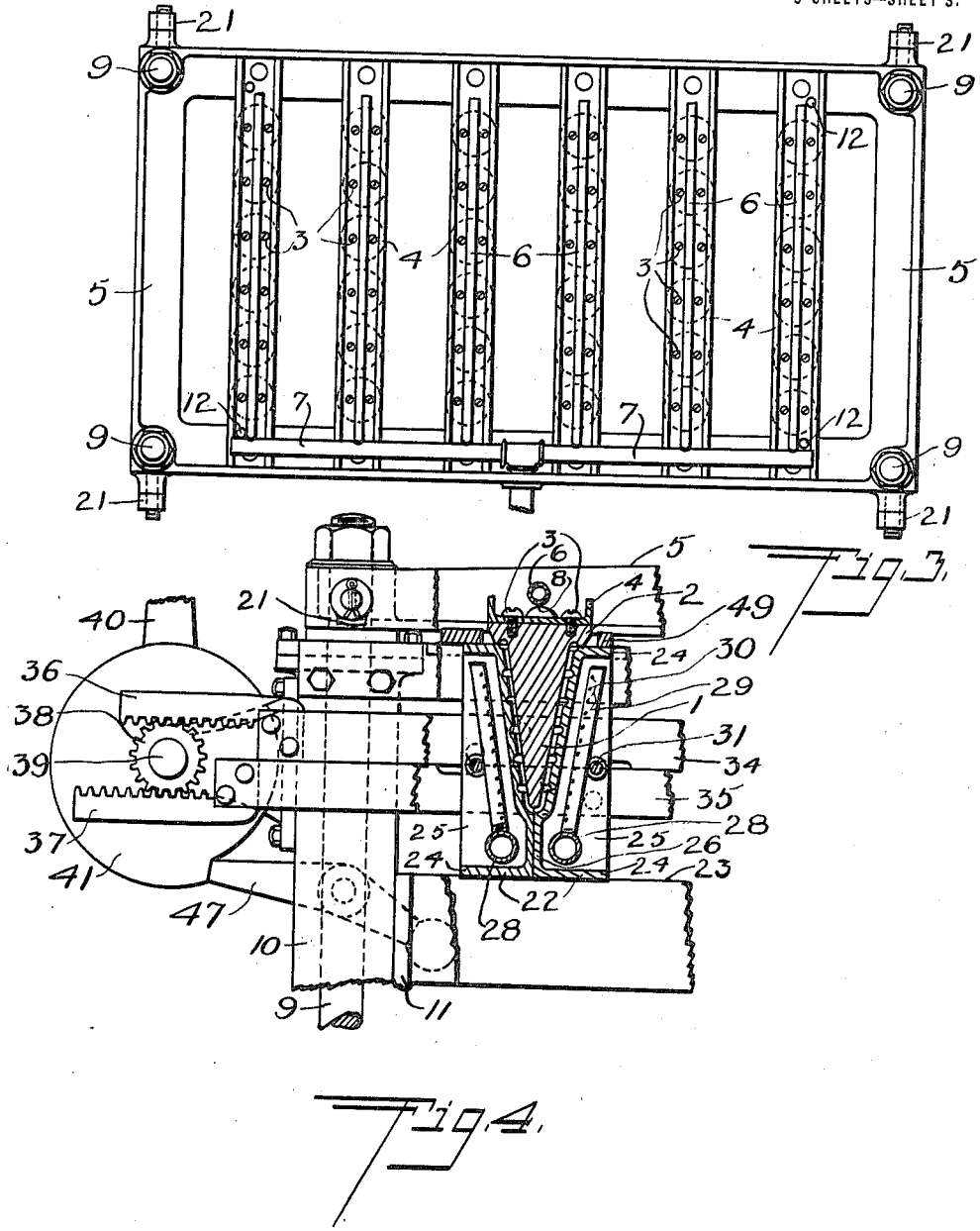

W. J. RUMPLE.
MACHINE FOR MAKING PASTRY.
APPLICATION FILED OCT. 19, 1911. RENEWED MAY 19, 1915.
1,151,548.
Patented Aug. 24, 1915.
5 SHEETS—SHEET 4.
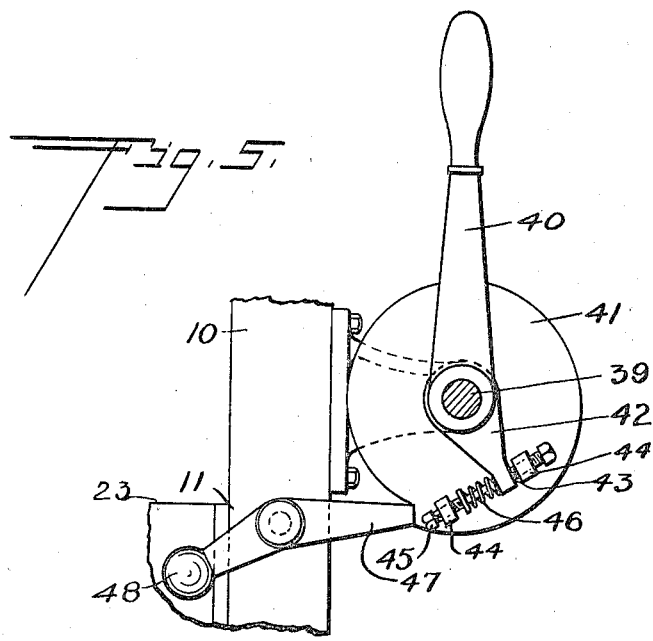
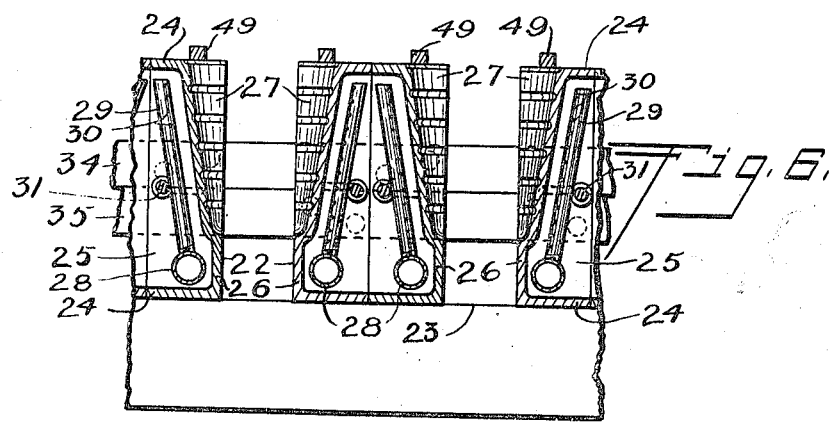
Witnesses
E. M. Peterson.
Ellis Saunders
Inventor
William J. Rumple
By Millard Eddy
Attorney W. J. RUMPLE.
MACHINE FOR MAKING PASTRY.
APPLICATION FILED OCT. 19, 1911. RENEWED MAY 19, 1915.

1,151,548.

Patented Aug. 24, 1915.
5 SHEETS—SHEET 5.

Witnesses
C. M. Peterson.
Ellis Saunders.

Inventor
William J. Rumple,
By Millard Eddy, Attorney

UNITED STATES PATENT OFFICE.

WILLIAM J. RUMPLE, OF OMAHA, NEBRASKA, ASSIGNOR, BY MESNE ASSIGNMENTS, TO LEE C. SHARP, OF PLATTSMOUTH, NEBRASKA.

MACHINE FOR MAKING PASTRY.

1,151,548.   Specification of Letters Patent.   Patented Aug. 24, 1915.

Application filed October 19, 1911, Serial No. 655,497. Renewed May 19, 1915. Serial No. 29,223.

*To all whom it may concern:*

Be it known that I, WILLIAM J. RUMPLE, of the city of Omaha, county of Douglas, and State of Nebraska, have invented certain new and useful Improvements in Machines for Making Pastry, which improvements are described in the following specification and are illustrated by the accompanying drawings.

The invention relates in general to machines for molding and baking pastry of various kinds, and in particular to icecream cone machines, so called, of that kind in which pairs of co-acting dies mold a plastic batter into the form of hollow receptacles for icecream, and hold the same in that form while baking.

It is the object of the invention to open and close the female dies of such a machine by sliding separable sections of those dies horizontally in opposite directions; to unite the separable sections of the female dies elastically, when they are brought together; to apply the batter in the first instance to the male dies alone, and to receive the drippings, if any, into the female dies; to produce an accurate centering of the male dies in the female dies, and to maintain under all circumstances a co-axial relation of the male to the female dies; to mount the male dies upon a vertically reciprocable frame, and to maintain that frame continually in a horizontal position; to prevent the separable sections of the female dies from being warped by the heat of baking, and to correct the distortion, if any, which may be produced by that cause; to control the alinement of the separable sections of the female dies; to produce in such a machine a regulated mixture of combustible gases as fuel for the baking; to bake all parts of the individual pastry cones uniformly, without inverting or otherwise changing the position of the dies for that purpose; to increase the capacity and efficiency of such machines; and in general to produce a superior machine of the specified kind. To accomplish this object I incorporate in my improved machine for molding and baking pastry a plurality of dependent male dies carried by a vertically reciprocable frame, and a plurality of subjacent axially split female dies mounted on a horizontal track.

The best manner in which I have contemplated applying the principles of the invention, is shown in said drawings; but, as many changes can be made in the construction of the machine, and many apparently different embodiments of these principles, without departure from the scope or spirit of the invention, it is intended that all matters contained in the following description, or shown in said drawings, shall be interpreted as illustrative and not in a limiting sense.

Figure 8:
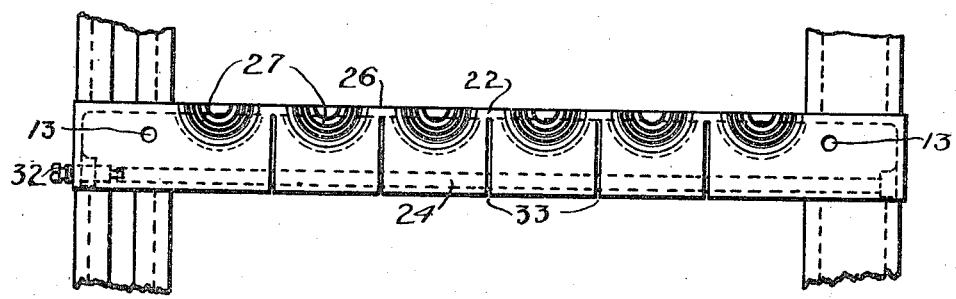
Figure 9:
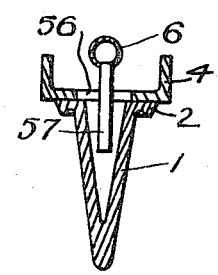

Figure 1 is a side elevation of an icecream cone machine that is constructed in accordance with the principles referred to. Fig. 2 is a front elevation of the same machine. Fig. 3 is a plan of the vertically reciprocable frame carrying the male dies. Fig. 4 is an enlarged side elevation of parts of Fig. 1, including a single pair of dies, male and female, shown in vertical axial section. Fig. 5 is a detail, being a reverse side elevation of parts of Fig. 4. Fig. 6 is also a detail, including a vertical section of two female dies, wide open as for discharging cones after baking. Figs. 7 and 8 are an elevation and a plan respectively of a separable section of the female split die on the horizontal track. Fig. 9 is a detail, including an axial section of the male die in a modified form.

In the machine which is shown in the first eight figures of these drawings, a plurality of male dies, or formers, 1, being solid metallic cones, pointing downward and provided at the top with peripheral annular shoulders 2, are fastened by screws 3 to the underside of the horizontal and parallel iron crossbars 4 of the vertically reciprocable rectangular die-frame 5. On this die-frame are also mounted a number of burners 6, connecting with the fuel-pipe 7 and having numerous mouths, or orifices, 8, opening downward toward the male dies respectively. This die-frame is kept horizontal by its four vertical legs 9, which are slidable up and down in the tubular corner posts 10 of the main frame 11; and carries centering pins 12, which are adapted to coöperate with the dowel holes 13 in the female dies.

The mechanism for raising and lowering the die-frame 5, comprises the hand-operated lever 15, the rockshaft 16 which is worked by that lever, the counter rockshaft 17 which is connected by the sprocket wheels 18 and the sprocket chain 19 to move in unison with the rockshaft 16, the rockarms 20 which are carried by said rockshafts, and the duplicate links 21 which connect said rockarms with the four corners of the die-frame respectively.

Each of the female dies, being divided in a vertical axial plane, comprises a pair of separable die-sections, or half-dies, 22, slidable to and from each other on the horizontal track 23, which is part of the main frame 11. Each of these die sections is a metallic shell, of general rectangular form, comprising the flat top and bottom plates 24, the vertical end walls 25, and the intermediate web, or face-plate, 26, in which are sunk a number of half-conical concavities 27, registering with like concavities in the adjacent die section of the same pair. When the correlative die sections are moved into contact with each other, the conical concavities formed between them are co-axial with the male dies respectively, as shown in Fig. 4; and when the male dies have penetrated these concavities to a suitable depth, the shoulders 2 impinge upon the flat top of the female dies, as shown in the same figure. In the hollow back of each die section is placed a fuel pipe 28, branching into burners 29, whose orifices, jets or nozzles, 30, are directed toward these concavities. Also in the same hollow back of each die section 22 is mounted a tension rod 31, which is provided with an adjusting screw 32, and operates to push apart or to draw toward each other the end walls 25 of the die sections for the purpose of preventing and of counteracting, as occasion may require, the tendency of the die sections to warp or bend when heated; to facilitate the straightening function of this tension rod the top plates and the bottom plates, 24, are cut by slots 33, as shown in Figs. 7 and 8.

The mechanism for operating the female dies on track 23 comprises a pair of horizontal bars 34 and 35, bolted to the alternate die sections 22 respectively, the two racks, 36 and 37, carried by those bars, a pinion 38, engaging those racks, a rockshaft 39 carrying this pinion, and a hand-lever arm 40 for operating this rockshaft. For the purpose of locking the die sections together when the female dies are closed, this rockshaft 39 carries a loose ratchet wheel 41 and a fixed rockarm 42 which have a yielding engagement with each other by means of the terminal eye 43 of that arm, the lugs 44 on that wheel, the screw rod 45 held by said lugs and playing in said eye, and the coiled spring 46 on said rod. The pawl 47 is actuated by the counterweight 48 to engage this ratchet wheel in the position shown in Figs. 4 and 5, and thereby to lock the die sections together, and is operated by hand to release the ratchet wheel, and thereby to permit the die sections to be separated from each other as shown in Figs. 1 and 2. The stationary horizontal crossbars 49, being mounted on the main frame in sliding contact with the flat tops of the separable die sections, are adapted to act as strippers to loosen the baked cones from the female dies, as occasion may require, and as scrapers to free the latter from adhering pastry, while those dies are being opened to the position shown in Fig. 6. The truck 50, having wheels 51, and containing the batter that is to be molded and baked, is open at the top and is movable by hand on the horizontal track 52 to and from the positions shown in Figs. 1 and 2. All desired mixing of air and gases for burning is effected in the fuel chamber 53, to which those fluids are admitted under all necessary pressure and in regulated proportions and quantities through supply pipes that are not shown in the drawings. From this chamber the fuel is conducted through the flexible pipes 54 and the telescopically extensible pipe 55 to the fuel pipes 28 and 7 respectively. The inclined chute 58 has at the top a flaring mouth, or hopper, fastened to the track rails 23 and open upward immediately under all the female dies.

In that modification of my invention which is shown in Fig. 9, the male die 1 is hollow, the crossbar 4 has a vertical perforation 56 over the middle of that die, and the burner 6 has a tubular jet, or nozzle, 57, which, reaching down through that perforation, conducts the gaseous fuel into the middle of the die, and heats the latter, in each instance, by the flame which is produced in its hollow interior.

In using this machine, the operator, by depressing lever 15, raises the frame 5 to the position shown in Figs. 1 and 2; then, by raising the lever 40, brings the female die sections together in pairs, and locks them in that position, as shown in Figs. 4 and 5; then runs the batter truck to a position directly under the male dies, as shown in Fig. 1; then, by raising lever 15, dips those dies into the batter in that truck; then, by lowering that lever, lifts these dies and the adhering batter out of the batter truck; then removes the latter by hand from the vertical path of the die-frame 5, as shown in Fig. 2; in which position of affairs the drip from the male dies is caught in the female die; meanwhile heats all the dies, male and female, by lighting all the gas-jets and nozzles; then by lever 15 lowers the male dies and adhering batter into the female dies, where they are stopped by the contact of the shoulders 2 of the male dies with the top plates 24 of the female dies, closed and locked as described; at the same time, by the annular groove and peripheral cutting edge on the underside of these shoulders, so impinging upon these top plates, as shown in Fig. 4, he cuts off the surplus batter, if any, which has been carried by the male die to the mouth of the female die; then permits the batter cones between the male and the female dies to bake until done; meanwhile permits the steam, formed in the female dies, to escape between the elastically locked die sections of each pair, opening apart automatically for that purpose; then lifts the male dies again in the manner above described; then by the use of lever 40, slides the female die sections apart, as shown in Figs. 2 and 6, and thereby permits the baked cones to drop into the subjacent chute 58, by which they are conveyed from the machine.

If any of the baked cones should adhere to the inside of the female dies, and hesitate to drop into the chute 58 as just described, such adhering cones are pushed free from the female dies by the stripper 49. Or the male dies, when lifted but slightly in the female dies, will pull the baked cones from the separating die sections.

The combined hopper and chute 58 not only transfer the finished pastry from the machine, but also save fuel by preventing wasteful dissipation of heat from the dies immediately above.

I claim as my invention—

1. A machine for making pastry, comprising a female die split into separable die sections, racks secured to said die sections respectively, a pinion engaging said racks, a rockshaft carrying said pinion, a handlever, a rockarm and a loose ratchet-wheel on said rockshaft, a pawl for said ratchet-wheel, and a yielding connection between said ratchet-wheel and said rockers.

2. A machine of the specified class, comprising a series of female dies having top plates, a series of reciprocable male dies having cutting shoulders adapted to impinge upon the top plates, and means for scraping adhesive pastry from those plates.

3. In a machine for molding and baking pastry, a split die in combination with means for preventing and correcting distortion of the die sections by heat.

4. A machine for molding and baking pastry, comprising split dies and tensional means of controlling the distortion of the same by the heat of baking.

5. In a machine for molding and baking pastry, a plurality of male dies and of split female dies, coöperating therewith, in combination with means for counteracting the warping of the split female dies by the heat of baking.

6. In a machine for molding and baking pastry, a plurality of female die sections, each of which comprises a face plate, end walls connected by the face plate, and a screw rod acting between said walls.

7. In a machine for molding and baking pastry, a female die section, comprising a face plate, end walls of the face plate, and a tension rod acting between said end walls to push them apart or draw them together.

8. In a machine for molding and baking pastry, a female die section, comprising a face plate, slotted top and base plates connected by said face plate, end walls connected by said face plate, and tension mechanism connecting said end walls.

9. In a machine for molding and baking pastry, a female die section, comprising vertical end walls, slotted top and base plates, a face plate uniting said end walls and said slotted plates, a burner mounted behind said face plate, and means acting between said walls for exerting lateral tension thereon.

10. A machine of the specified class, comprising female dies having separable die sections, flat on top, means for separating the sections, and stationary stripper bars in scraping contact with the flat tops of the separating die sections.

11. A machine of the specified class, comprising a series of female dies, a reciprocable frame provided with a corresponding series of male dies to coact with the female dies, means for introducing batter into the female dies, means for trimming off surplus batter around the mouths of the female dies, means for supplying heat to bake the batter, and means for scraping the surplus pastry from the female dies and for removing the same from the machine.

12. A machine of the specified class, comprising a plurality of female dies having separable die sections, a horizontal track for the die sections, means for reciprocating the die sections on the track, means for trimming off surplus pastry material around the mouths of the female dies, means for detaching the baked pastry and the trimmings from the die sections while separating, and for conducting the same from the machine.

13. A machine for making pastry, comprising a female die having separable die sections, means for separating the sections and for scraping adhesive pastry from the die sections while separating.

14. A machine for making pastry, comprising a plurality of female dies having separable sections, a horizontal track for the sections, means for reciprocating the die sections on the track, a plurality of male dies, means for moving the male dies into and out of the female dies, means for heating the dies, stationary means for collecting the pastry from the dies and discharging the same from the machine.

15. A machine for making pastry, comprising a female die having separable die sections, means for separating the sections, means for scraping pastry from the separating sections and for removing the same from the machine.

16. A machine for molding and baking pastry, comprising a series of female dies, a reciprocable frame provided with a corresponding series of male dies to co-act with the female dies, means for introducing batter into the female dies, means for supplying heat to bake the pastry, and stationary external means for separating the pastry from the female dies and for removing the same from the machine.

In testimony whereof I hereunto subscribe my signature in the presence of two witnesses.

WILLIAM J. RUMPLE.

Witnesses:
  E. M. PETERSON,
  WILLARD EDDY.